Jan. 17, 1933.  K. WERNER  1,894,839
SUSPENSION SPRING
Filed Feb. 5, 1931
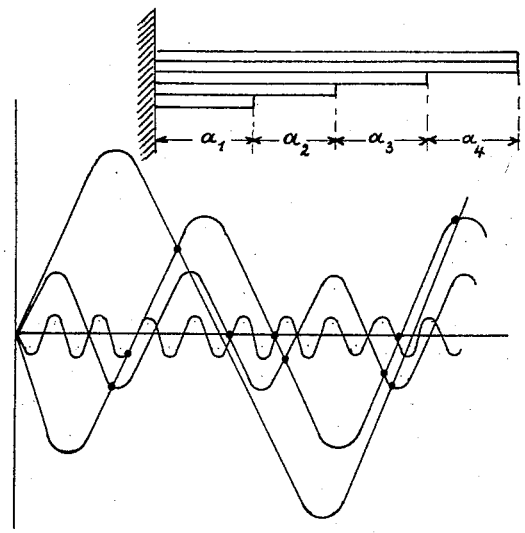
Fig.1.a.
Fig.1
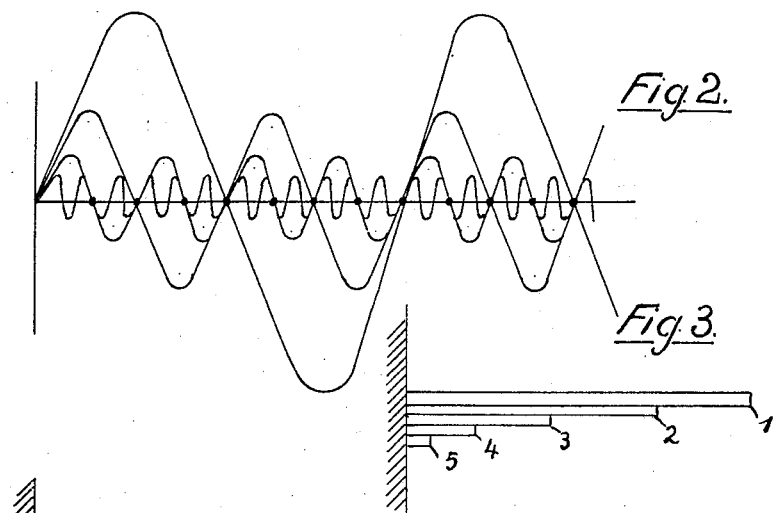
Fig.2.
Fig.3.
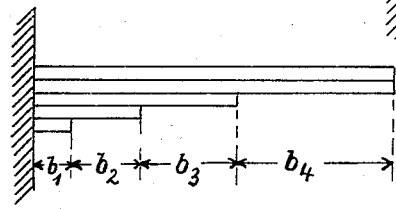
Fig.2.a.

Patented Jan. 17, 1933

1,894,839

UNITED STATES PATENT OFFICE

KARL WERNER, OF NUREMBERG-EIBACH, GERMANY

SUSPENSION SPRING

Application filed February 5, 1931, Serial No. 513,707, and in Germany February 6, 1930.

This invention relates to a laminated leaf spring the plates of which form steps, and it is intended to devise means to improve and to facilitate the construction and mode of application of such a spring and to increase the efficiency and generally improve the adaptability thereof. The spring according to the invention, among other uses, may be particularly applied to motor-vehicles and the like, without, however, being restricted to such manner of application.

When the well known triangular leaf spring is subdivided in the usual manner into an even number of individual plates of equal width and when these plates are superposed on each other so as to form a laminated leaf spring, it will be observed that this laminated leaf spring, when caused by an external force to swing, is acting in a manner quite different from the working of the original triangular leaf spring caused to swing by the same force. This has its cause in that the plates, the lengths of which successively decrease the same amount show natural oscillation frequencies which have no lawful and regular mutual relation to each other. For this reason such a spring is hardly useful for vehicle suspensions because it is not enabled to completely absorb and annihilate in itself by oscillating the shocks to be damped, but transmits a large portion of the shock-energy to the vehicle frame which is thereby caused to execute disagreeably felt oscillations of longer duration. This inconvenience takes place especially when running on bad roads with longer series of holes, on railway crossings and similar carriage-ways. It has been proposed to obviate this drawback by means of shock-dampers, but in this way it has not been possible to completely avoid the unfavorable effects of the usual laminated and stepped leaf springs. Furthermore, the use of shock-dampers produces very high mechanical over-stresses on the vehicle suspensions and on the vehicle frame.

According to the invention, these drawbacks of the usual laminated and stepped leaf spring are avoided by that the lengths of the several spring steps calculated from the spring band or fixing point to the ends of the different plates are brought in such a mutual relation to each other that the times or periods of the oscillations vary from step to step in a lawful regular manner. It has been stated that the best results are obtained in the case where this variation follows exactly or approximately a geometrical series. The several steps may contain one or more plates and the same or different numbers of plates. A laminated and stepped leaf spring constructed according to the principle of the invention shows practically the same duration of swinging as a leaf spring formed from the same plates without superimposition of the plates. Therefore this laminated leaf spring is capable of absorbing and annihilating elastically to an extremely large extent the shocks acting upon it for instance on uneven roads so that the vehicle frame does not practically receive shocks from the suspension even in the case of an extraordinary unevenness of the road or of a larger series of holes succeeding each other in a short distance or of similar obstacles but is passed over the obstacles in a soft swinging manner.

The accompanying drawing shows in Figs. 1 and 2 the oscillation waves of the usual laminated and stepped leaf spring and of the spring according to the invention respectively. Fig. 1a illustrates a normal four-stepped laminated spring and Figs. 2a and 3 represent by way of example two forms of embodiment of the spring according to the invention.

As shown in Fig. 1, the oscillation waves of a usual four-stepped laminated spring having according to Fig. 1a for instance five plates and equal or irregularly unequal step distances $a_1$ to $a_4$, intersect each other at completely irregular points above and below the zero line whereby the swinging energies of the several plates become bruised and will be operative in large portion as external force acting upon the vehicle frame and imparting to the same strong shocks and trepidations. On the contrary, in Fig. 2 which relates to a four-stepped laminated spring with five plates constructed according to the invention and shown in Fig. 2a, the periods and times of oscillation of the plates of the different steps are chosen according to a geometrical series in a predetermined lawfulness and the whole lengths of the plates of the several steps calculated from the ends of the plates to the fixing point and decreasing successively the amounts $b_1$ to $b_4$ are dimensioned in conformity with this predetermined lawfulness so that all the intersecting points of the oscillation waves lay on the zero line. In this way it is obtained that the energy imparted to the spring by external shocks is completely absorbed in the plates by swinging without practically producing an external force acting upon the vehicle frame. In Fig. 2 the largest oscillation time is a whole multiple of each of the shorter oscillation times whilst in Fig. 1 the different times or periods are in no systematic mutual relation to each other. For instance, the oscillation times of the different steps of the laminated spring according to the invention may follow the geometrical series 2, 4, 8, 16 or 3, 9, 27 wherefrom plate lengths result which have 16, 25, 40, 64 and 22, 43, 90 units of measurement respectively from the fixing point to the free end. In practice the laminated springs for vehicles are constructed with three or six steps according to these or other geometrical series. When employing thin individual plates, it is advantageous to provide a thicker upper layer of plates in order to be enabled to make sufficiently strong the eyes of this plate serving to receive the spring bolts. In this case the longest step for instance of a four-stepped laminated spring shown in Fig. 3 may be composed of two plates 1 and 2, the upper 1 of which has the thickness required for obtaining the necessary mechanical resistency of the eyes, whilst the second plate 2 is thinner and at the same time has a length calculated from the fixing point to the free plate end so that the thin plate 2 has the same oscillation time as the thicker plate 1. The other plates 3, 4, 5 are dimensioned and stepped in their length so that their oscillation times are proportionated to each other according to a geometrical series. In the same manner as the longest step also the other steps of the spring may be composed of two or more plates of different lengths but of the same oscillation period. When employing plates of different widths, the lengths of the several plates appertaining to the same step are to be dimensioned so that the oscillation times or periods of these plates are in each step equal to each other.

The front-springs and the back-springs of a vehicle may be constructed so that swinging resonances between these springs and thereby harmonious oscillation conditions unfavorable for the vehicle are avoided. To this end these springs can be formed so that the oscillation times or periods of the longest steps of the springs are not equal to each other and not a whole multiple of each other, but are proportionated to 1:1,5 or 1:1,25. The several steps of the front-springs and the back-springs themselves, on the other hand are dimensioned as regards the lengths of their plates so that the oscillation periods vary from step to step according to a geometrical series.

It is obvious and should be understood that the arrangement of springs according to this invention may be employed also for other purposes such as for instance for the spring mounting of the saddle and of the front fork in cycles and the like, and that the invention is susceptible of modifications in various particulars without departing from the spirit and scope of the invention or sacrificing any of its advantages in the meaning of the appended claims.

I claim:—

1. A laminated and stepped leaf spring especially for motor cars and the like, the lengths of the several steps from fixing point to plate end being dimensioned and brought in mutual relation so that the oscillation times of the spring plates appertaining to the different steps are proportionated according to a geometrical series.

2. A suspension spring especially for vehicles and the like comprising a plurality of plates forming steps, the lengths of the several steps from fixing point to plate end being brought in such a mutual dimensional relation to each other that the oscillation periods of the plates appertaining to the different steps follow from step to step a geometrical series, at least one of the steps consisting of at least two spring plates of the same oscillation time.

3. A suspension spring comprising a plurality of superimposed plates forming four steps, the lengths of the plates from fixing point to plate end being proportionated from the longest to the shortest step in the relation 16:25:40:64 whereby the oscillations of the spring plates appertaining to the different steps are proportioned according to the geometrical series 2:4:8:16.

4. A suspension spring comprising a plurality of superimposed plates forming three steps, the lengths of the plates from fixing point to outer plate end being proportionated from the shortest to the longest step in the dimensional relation 22:43:90 whereby the oscillations of the spring plates appertaining to the different steps are proportioned according to the geometrical series 3:9:27.

5. A laminated four-stepped leaf spring especially for vehicles, the lengths of the plates from fixing point to plate end decreasing successively from the longest to the shortest step in the proportion 64:40:25:16, the longest step consisting at least of two plates of different thicknesses but of the same oscillation time.

6. A three-stepped laminated suspension spring especially for vehicles and the like, the lengths of the several plates from fixing point to plate end increasing gradually from the shortest to the longest in the proportion 22:43:90, the longest step consisting of at least two plates of different thicknesses but of the same oscillation time.

In testimony whereof I affix my signature.
KARL WERNER.